United States Patent [19]

Gluz

[11] Patent Number: 5,335,285
[45] Date of Patent: Aug. 2, 1994

[54] EARPHONE-TYPE SPEAKER ASSEMBLY

[76] Inventor: Jacob Gluz, 92 Woodlawn, Dollard des Ormeaux, Quebec H9A 1Z2, Canada

[21] Appl. No.: 69,189

[22] Filed: Jun. 1, 1993

[30] Foreign Application Priority Data

Jun. 11, 1992 [CA] Canada ................... 2071840

[51] Int. Cl.⁵ .................................. H04R 25/00
[52] U.S. Cl. ............................ 381/187; 381/183; 381/68.5; 351/123; 455/344
[58] Field of Search ............... 381/183, 187, 25, 68.5, 381/68.6, 205, 169, 188; 455/351, 350, 344, 340; 181/128, 129; 351/123, 158, 41, 111

[56] References Cited

U.S. PATENT DOCUMENTS

| | | | |
|---|---|---|---|
| 3,928,734 | 12/1975 | Noury, Jr. ................. | 381/169 |
| 4,453,050 | 6/1984 | Enokido ..................... | 381/187 |
| 4,668,842 | 5/1987 | Yokoyama et al. ......... | 381/183 |
| 4,856,086 | 8/1989 | McCullough ............... | 455/344 |
| 4,882,769 | 11/1989 | Gallimore ................... | 455/344 |
| 4,901,355 | 2/1990 | Moore ........................ | 381/68.5 |
| 4,902,120 | 2/1990 | Weyer ........................ | 351/41 |
| 5,020,150 | 5/1991 | Shannon et al. ........... | 455/343 |
| 5,035,005 | 7/1991 | Hung .......................... | 381/188 |
| 5,159,639 | 10/1992 | Shannon et al. ........... | 381/68.5 |

*Primary Examiner*—Curtis Kuntz
*Assistant Examiner*—Huyen D. Le

[57] ABSTRACT

A speaker assembly for securement to the temples of an eyeglass frame, such as sunglasses, is disclosed. In particular the assembly includes an adjustable support which is detachably secured to the temples or fixed permanently thereto. The speaker is supported spaced from the frame and the particularity of its mounting is that it can be pivoted to emitt sound towards the ear of a wearer or fully away from the ear or any intermediate position. This permits the wearer to adjust the direction of the speakers to hear other important sounds that may be directed at him from his back or sideways. Accordingly, if the wearer is listening to the radio in an area where important sounds need to be heard, such as in vehicle traffic, the traffic sound will overpower the earphone speaker sound.

2 Claims, 3 Drawing Sheets

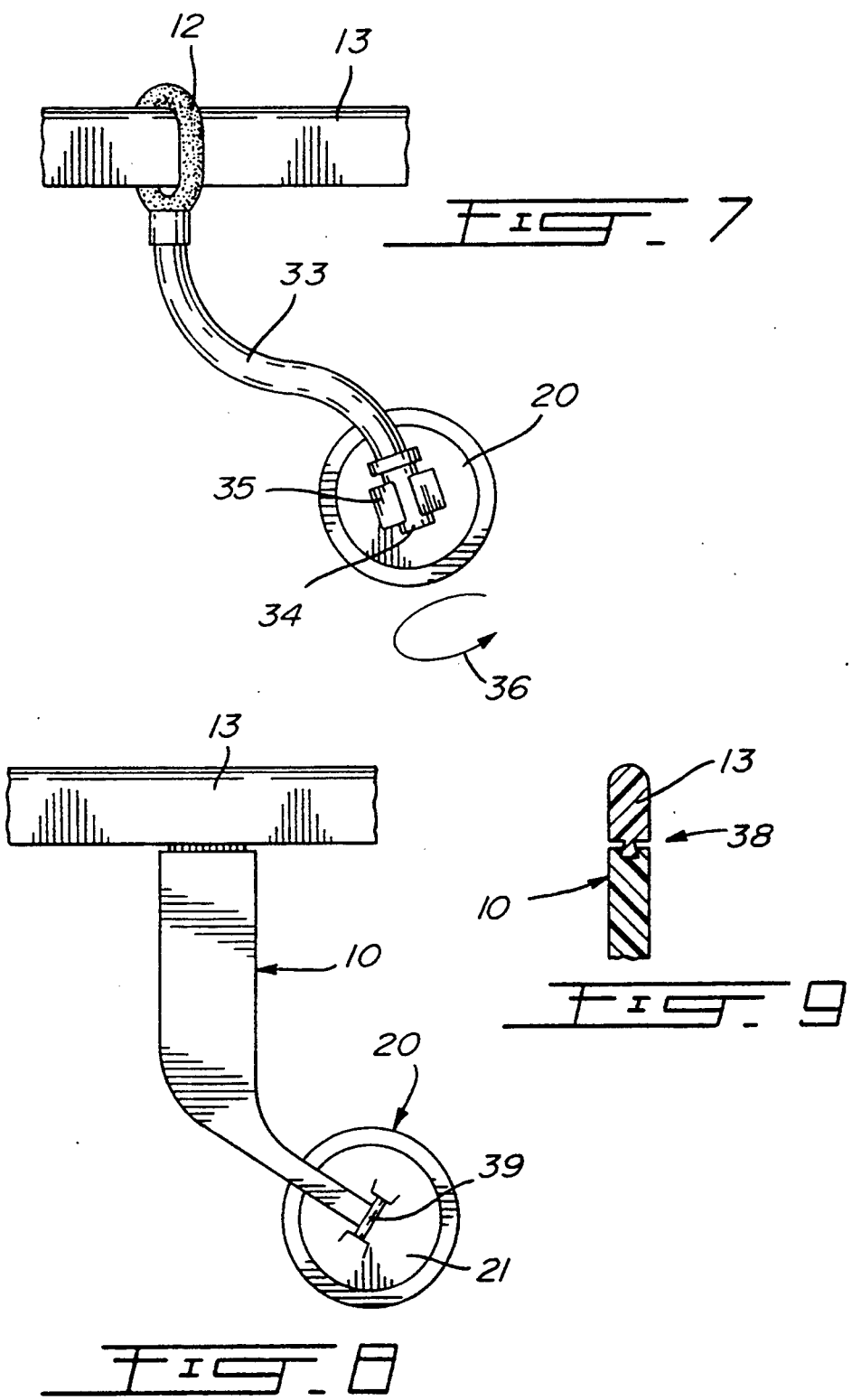

EARPHONE-TYPE SPEAKER ASSEMBLY

The present invention relates to an earphone-type speaker assembly for securement to the temples of eyeglasses, and particularly sunglasses, and wherein the speakers of the earphones are rotatable to be oriented at any desired angle relative to the ear of a wearer.

it is known to provide miniature radios in eyeglass frames and to mount the earphones on the temples of the eyeglasses in a sliding adjustable fashion as disclosed in U.S. Pat. No. 4,882,769 issued Nov. 21, 1989 to Bruce A. Gallimore. This is considered to be the closest prior art to this invention because of the manually adjustable feature of the earphones on the temples of the eyeglass frame. U.S. Pat. Nos. 4,856,086 and 5,020,150 disclose suspending earphones from their conductive wires attached to the temples of the eyeglass frame.

A problem with such earphone speaker attachment is that the speakers are either always disposed directly within the ears of the wearer or else are closely spaced to direct sound again directly within the ears. Because of the popularity of such eyeglass frames with radios incorporated within the frame, they are often worn during a sports activity, such as jogging, cycling, skiing, boating, etc. and have proven to be very hazardous. They prevent the wearer from hearing sounds that can prevent accidents from occuring, such as traffic sound, or other oncoming sounds signalling an approaching person or object that the wearer must react to in order to avoid collision and injury.

It is an object of this invention to provide an earphone-type speaker assembly securable to the temples of an eyeglass frame and which permits the wearer to adjust the position of the speakers whereby to hear other important sounds as well as radio emitted sounds, when desired.

Another object is to provide an earphone-type speaker assembly securable to the temples of an eyeglass frame and which permits the wearer to adjust the position and direction of the speakers relative to the temples of the eyeglass frame as well as to the position of the wearer's ears and further wherein the assembly is removably connectable to the temples of the eyeglass frame with the radio receiver mounted in the eyeglass frame or externally.

My invention therefore provides a speaker assembly for securing to the temples of eyeglasses, such as sunglasses, and comprising a support securable to each temple of the eyeglass frame and having a speaker secured thereto and spaced from the frame at a position forward of the ears of the wearer, a pivot connection secures the speaker at a desired position relative to an ear of the wearer so that the wearer can hear sound emitted by the speaker as well as other sounds in his environment, when desired, by displacing the speaker on the pivot connection.

In the drawings:

FIG. 7 is a sideview showing a still further version of a support means which is provided by a bendable element;

FIG. 8 is a sideview of a still further version of a support means which is slidably connected to the temples of an eyeglass frame; and FIG. 9 is a section view showing the slidable connection of FIG. 8.

Figure 1:
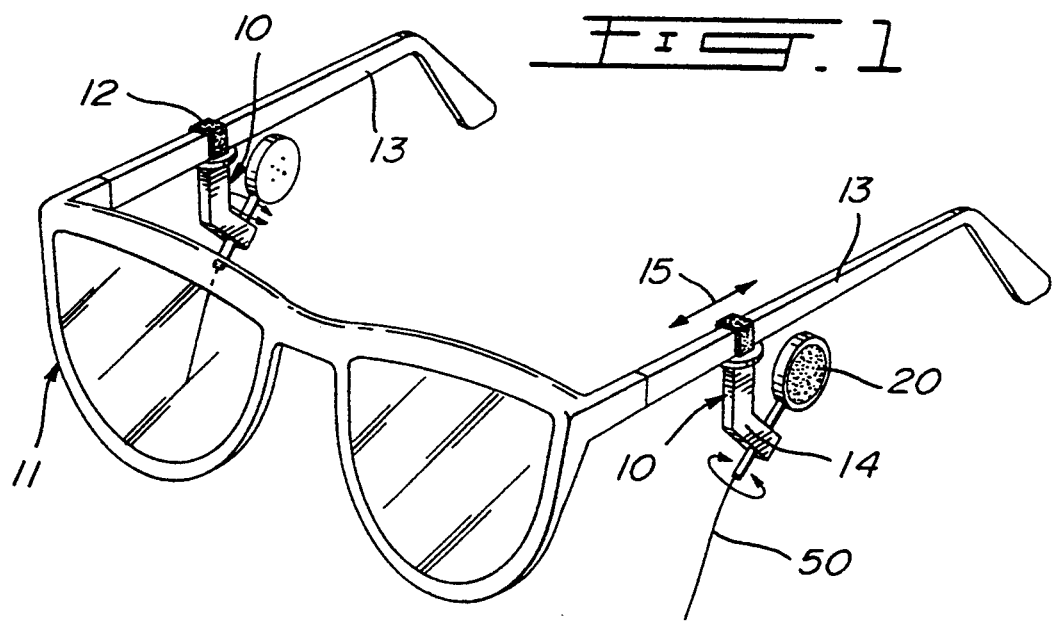
FIG. 1 is a perspective view illustrating an eyeglass frame on which the earphone-type speaker assembly of the invention is removably secured to the temples of the frame.
Figure 2:
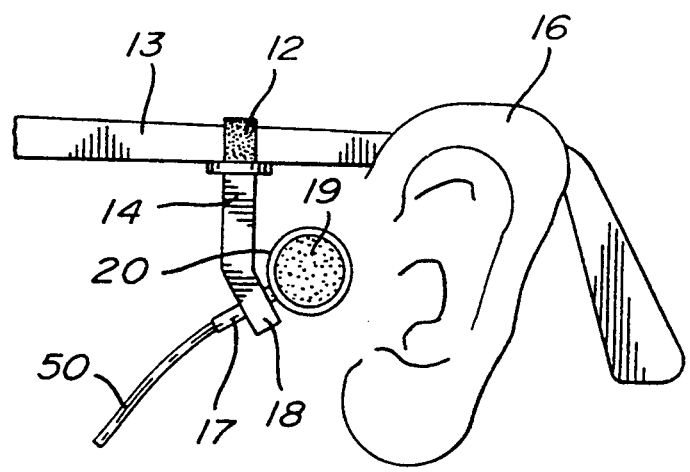
FIG. 2 is a side view showing the speaker oriented to direct sound away from the wearer's ear.
Figure 3:
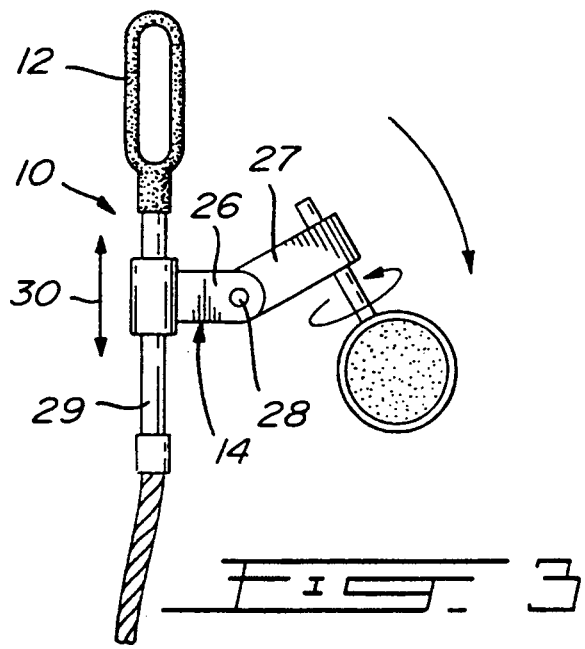
FIG. 3 is a perspective view showing the articulated support of the earphone speaker showing the variety of possible adjustments of the speaker position.

As shown in FIGS. 1 and 2, the eyeglass frame 11 is shown with the earphone speaker assembly 10 of the present invention slidingly attached by slidable adjustable means, such as the elastic loop 12 to a respective one of the temples 13 of the frame 11. The elastic loop 12 permits the adjustable positioning of the speaker support frame 14 along the temples in the directions of arrows 15 to position same relative to the ear 16 of a wearer, as shown in FIG. 2.

The speakers 20 are herein shown as provided with a pivot rod 17 secured thereto and rotatably connected to a free end 18 of the support frame 14 for axial rotation of the rod 17 to permit the speaker diaghram 19 to be oriented towards or away from the wearer's ear 16 at any desired angle so that the wearer can hear the radio sound from the speakers 16 as well as other environmental sounds.

Referring also to FIGS. 3 to 6, it can be seen that the speaker housing 21 may have a pivot connection 22 with the rod 17 to provide a further articulation for adjusting the position of the speaker 20. The pivot rod 17 may also be axially displaceable within the clamp 24 as indicated by arrows 23. The rod 17 can also rotate within the clamp 24 as indicated by arrow 25 for rotating the speaker 360 degrees with respect to the wearer's ear 16.

The support frame 14 may also comprise a stationary support section 26 and a pivotal support section 27 interconnected by a friction pivot connection 28 to provide a still further angular adjustment to position the speakers closer or further from the temples 13 of the eyeglass frame 11. The stationary support section 26 may also be slidingly connected on a depending shaft 29 suspended from the temples by the elastic connector 12. This would provide a still further adjustment in the direction of arrows 30. Accordingly, the support frame would permit fitting the speaker assembly on children eyeglass frames as well as adult frames.

Figure 5:
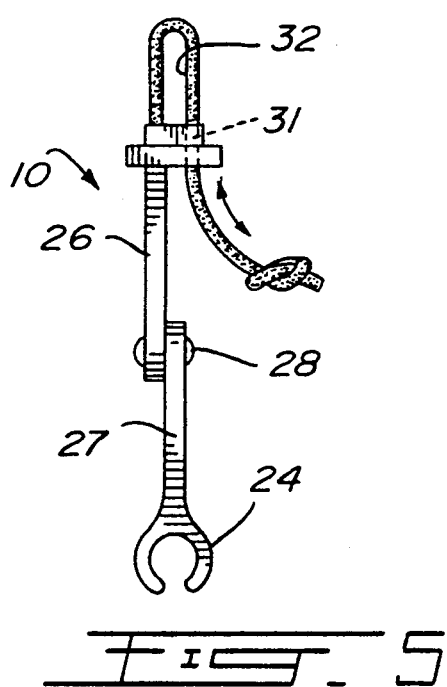
FIG. 5 shows a still further version of the support means.

As shown in FIG. 5 the loop 12 may be provided by a non-elastic cord which is passed through a friction bore 31 in a base wall of the stationary support section 26 whereby the size of the loop is variable to fit and secure the frame 10 the temples 13.

FIG. 7 shows a still further modification of the support frame 10 and as herein shown it is formed from an elongated bendable element 33 capable of retaining its shape when bent to position the earphone 20 at a desired position relative to the wearer's ear. Such bendable material is well known in the art and therefore not described in detail herein. The free end of the bendable element is also provided with a pivot connection post 34 for friction retention to a clamp 35 provided on the housing 21 of the earphone 20. Thus, the earphone can rotate about the post 34 as indicated by arrow 36.

FIGS. 8 and 9 show another modification wherein the support frame 10 is a stationary frame which is slidably connected to a lower edge 37 of the temples 13 by a tongue and groove connection 38 as shown in cross-section in FIG. 9. The frame 10 could slide off from the rear of the temples where the groove would have an open end. The free end of the support frame 10 also has a pivot connection 39 for pivotal displacement of the earphone 20.

Figure 4:
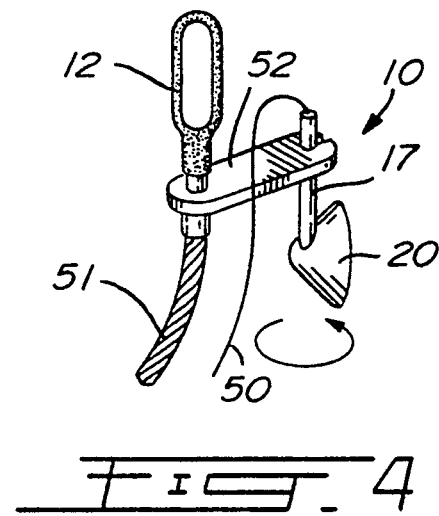
FIG. 4 shows another version of the support means and the adjustable feature of the speaker.
Figure 6:
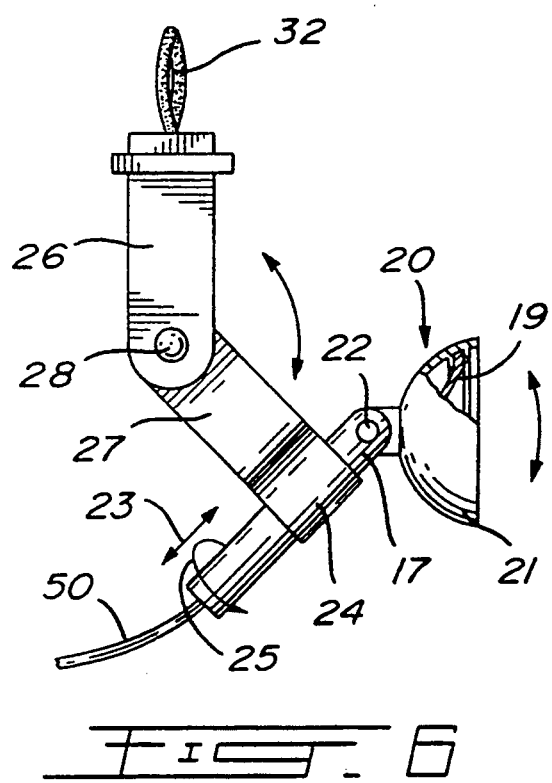
FIG. 6 shows the support means of FIG. 5 with the speaker and connecting shaft detachably secured to the support means and the various pivot adjustments provided.

Many other modifications are forseen without departing from the spirit of the present invention. For example only, the shaft 17 of the earphone as shown in FIG. 6 may be disconnected from the clamp 24 to located the earphones speakers 20 directly into the ears of the wearer without the use of the eyeglass frame. As herein show the electrical wires 50 connect to a remote portable radio receiver not shown. As shown in FIG. 4, the speaker assembly 10 is connected to a neckband 51 to suspend the eyeglass frame about the wearer's neck when the eyeglasses are not worn. The earphones 20 may also be disconnected from their support frame 14 which is herein shown as a connecting bracket 52. There are numerous other adjustable connections that may be provided for securing the support frame 10 to the eyeglass temples 13.

I claim:

1. An earphone-type speaker assembly for securement to the temples of an eyeglass frame, said speaker assembly comprising rigid support means slidably securable to said temples of said eyeglass frame for position at a predetermined location and having a speaker secured thereto and spaced from said frame at a position forward of the ears of a wearer of said eyeglass frame, a pivot connection for securing said speaker to a free end of said support means to orient said speaker at a desired position relative to an ear of a wearer so that said wearer can hear sound emitted by said speaker as well as other sounds in his environment, when desired, by displacing said speaker on said pivot connection, wherein said speaker is comprised of a housing said pivot connection having a connecting shaft secured to said housing, said connecting shaft being displaceable retained for axial rotation within a clamp provided at said free end of said support means to rotate said speaker housing 360 degrees about said shaft, said connecting shaft being an elongated shaft capable of axial longitudinal displacement in said clamp to position said speaker closer or further from said free end of said support means, said support means being comprised of a stationary support having a pivot connection at an end thereof.

2. An earphone-type speaker assembly as claimed in claim 1 wherein said slidably securable means is comprised by a support frame slidably connected to a lower edge of each said temple by a tongue and groove connection.

* * * * *